(12) United States Patent
Bayer et al.

(10) Patent No.: US 11,477,567 B2
(45) Date of Patent: Oct. 18, 2022

(54) METHOD AND SYSTEM FOR LOCATING AN ACOUSTIC SOURCE RELATIVE TO A VEHICLE

(71) Applicant: Robert Bosch GmbH, Stuttgart (DE)

(72) Inventors: Christoph Bayer, Pforzheim (DE); Gennady Benderman, Karlsruhe (DE); Timo Winterling, Stuttgart (DE); Wilhelm Christopher Von Rosenberg, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 366 days.

(21) Appl. No.: 16/713,261

(22) Filed: Dec. 13, 2019

(65) Prior Publication Data

US 2020/0204903 A1    Jun. 25, 2020

(30) Foreign Application Priority Data

Dec. 21, 2018    (DE) ...................... 10 2018 222 862.0

(51) Int. Cl.
*H04R 1/20*    (2006.01)
*B60Q 5/00*    (2006.01)
*B60W 40/02*    (2006.01)
*H04R 5/04*    (2006.01)

(52) U.S. Cl.
CPC ............... *H04R 1/20* (2013.01); *B60Q 5/005* (2013.01); *B60W 40/02* (2013.01); *H04R 5/04* (2013.01); *B60W 2420/54* (2013.01); *B60W 2420/60* (2013.01); *H04R 2499/13* (2013.01)

(58) Field of Classification Search
CPC ........ H04R 5/04; H04R 1/20; H04R 2999/13; B60W 40/02; B60W 2420/54; B60W 2420/60
USPC .................................................. 381/86, 302
See application file for complete search history.

(56) References Cited

U.S. PATENT DOCUMENTS

| | | | |
|---|---|---|---|
| 8,649,529 B2 * | 2/2014 | Klefenz | G01S 3/809 381/92 |
| 9,544,736 B2 * | 1/2017 | Yang | G01C 21/206 |
| 9,743,202 B2 * | 8/2017 | Orman | G01S 5/20 |

* cited by examiner

*Primary Examiner* — Disler Paul
(74) *Attorney, Agent, or Firm* — Maginot, Moore & Beck LLP

(57) ABSTRACT

An improved method for locating an acoustic source relative to a vehicle that requires, for example, only a single microphone is disclosed. The method comprises: obtaining an acoustic signal transmitted by the acoustic source; determining an observer frequency, referenced to the vehicle, of the acoustic signal; stipulating a velocity of the acoustic source; stipulating a relative position of the acoustic source relative to a position of the vehicle; determining a signal frequency; and locating the acoustic source by performing, n times, a Doppler calculation using the determined observer frequency, the stipulated velocity, the determined signal frequency, and the stipulated relative position.

13 Claims, 3 Drawing Sheets

METHOD AND SYSTEM FOR LOCATING AN ACOUSTIC SOURCE RELATIVE TO A VEHICLE

This application claims priority under 35 U.S.C. § 119 to application no. DE 10 2018 222 862.0, filed on Dec. 21, 2018 in Germany, the disclosure of which is incorporated herein by reference in its entirety.

TECHNICAL FIELD

The present disclosure relates generally to locating an acoustic source relative to a vehicle. In particular, the disclosure relates to a method, an apparatus and a system for locating an acoustic source relative to a vehicle. Further, the disclosure relates to a program element and a computer-readable medium having such a program element. The disclosure can be used in particular for a vehicle traveling in an at least partially automated fashion.

BACKGROUND

During the operation of a vehicle, a vehicle driver can hear different ambient sounds from the vehicle environment. In particular warning signals or audible signals, such as e.g. special signals from service vehicles, horn signals, etc., are important to driving safety. The vehicle driver can readily detect these signals by his/her ear and can frequently also classify them according to importance and can approximately locate the acoustic source, that is to say the noise source or sound source. As a result, the vehicle driver can clear a lane for the identified service vehicle, for example, or can perform other suitable driving maneuvers. By contrast, driver assistance systems or systems allowing at least partially automated driving are not readily able to detect audible signals, e.g. warning signals, ambient sounds, etc., in the first place or to infer suitable driving maneuvers therefrom. There may therefore be a need for an opportunity to provide a way of locating an acoustic source as independently of the vehicle driver as possible.

SUMMARY

Embodiments of the disclosure provide an improved method and system for locating an acoustic source relative to a vehicle. Expedient developments of the disclosure are obtained from the description and the accompanying figures.

A method, proposed in accordance with a first aspect, of locating an acoustic source relative to a vehicle can be performed in computer-aided fashion, in particular. By way of example, the method can be carried out in a data processing device of the vehicle, such as for example an electronic controller or a controller pool. The method has the following steps:

An acoustic signal transmitted by the acoustic source is obtained. The acoustic signal can be for example an emergency signal that can be produced by an emergency horn or siren, etc. The frequency of an emergency signal can vary depending on the country in which the vehicle is used, but is typically prescribed or standardized. In Germany, for example, an emergency signal can be between in a range from 360 Hz and 630 Hz.

An observer frequency, referenced to the vehicle, of the obtained acoustic signal is determined. The observer frequency can be determined e.g. by means of an, in particular computational, evaluation of the acoustic signal in the data processing device. In other words, the determination can be based on measurement.

A velocity and direction of the acoustic source are stipulated. In this context, stipulating can be understood to mean in particular that a value is assumed.

An acoustic source position of the acoustic source relative to a position, in particular a current position, of the vehicle is stipulated. In this context, stipulating can be understood to mean in particular that a value is assumed.

A signal frequency of the acoustic signal is determined or stipulated. In this context, stipulating can be understood to mean in particular that a value is assumed.

The acoustic source is located by means of a Doppler calculation, performed n times, in particular iteratively, using the observer frequency, the velocity, the direction of movement of the signal, the signal frequency and the acoustic source position. The Doppler calculation can be effected in particular by the data processing device. The variable n can be a natural number. Proper motion can also be removed in this case.

The Doppler calculation can be effected for example according to the equation $$f_s = f_E \frac{c + |\overline{v_s}|\cos(\gamma - \alpha)}{c + |\overline{v_E}|\cos\alpha}$$

where $f_S$ is the signal frequency, $f_E$ is the observer frequency, c is the speed of sound, $|\overline{v_S}|$ is the velocity of the acoustic source with a direction provided by $\gamma$, $|\overline{v_E}|$ is the velocity of the vehicle and the angle between the direction of movement of the vehicle and the acoustic source $\alpha$. For an iterative examination, the relative position statements between the acoustic source and the vehicle are additionally estimated. In this instance, the observer frequency is determinable, e.g. measurable. The remaining variables are unknowns, which are therefore stipulated or based on assumptions.

This method can be used to determine the direction, distance, velocity, direction of movement and/or frequency of the acoustic signal relative to the receiver, that is to say the vehicle. The method uses in particular the insight that the velocity of the acoustic source, if it is likewise a road user or a vehicle, service vehicle, etc., has a maximum velocity, and for example the frequency of the acoustic signal is within a frequency range, for example stipulated by a standard, e.g. by a, plus/minus the realistic Doppler shift in the frequency of the acoustic signal. If the acoustic source and the vehicle are also moving relative to one another, the Doppler effect causes a Doppler shift, the change in which is used by the method to determine the position of the acoustic source and other parameters. Both effects, that is to say the limiting of the stipulations to a specific range of values and changes in the Doppler shift, permit a good assessment of the stipulations, which can also be referred to as variables, for the Doppler calculation or the locating of the acoustic source. As a result, the method allows the acoustic source to be located and the transmitted frequency, the velocity and the direction of travel thereof to be determined. As such, it is also possible for the type of acoustic source to be determined. The data ascertained by the acoustic recording device can then be used for sensor data fusion for driver assistance functions and/or for the at least semi-automated driving. In particular, this allows driving functions of the vehicle to be controlled more accurately or else a driving strategy to be ascertained. In one exemplary driving scenario, the vehicle can yield to a service vehicle, which has higher priority in road traffic, e.g. to the clearing a lane by means of an automated driving maneuver.

In one development, the velocity, the acoustic source position and/or the signal frequency can be stipulated within an associated range of values having a plurality of single values, said range of values being at least approximately implementable in a current driving situation on which the locating is based. As mentioned above, for example an emergency signal will be within a determined or possibly standardized frequency range, so that a possible range of values for the signal frequency is delimitable and the number of stipulations is likewise delimitable. The range of values for the stipulations can also be limited for the acoustic source position, since the acoustic signal is detectable only within a short to medium-range distance, but not over a distance of kilometers, for example. The range of values for the velocity can also be limited, since in particular a service vehicle can only have an upwardly restricted speed. Exemplary step sizes for the stipulations within the respective range of values can be for example 5 m steps for a distance of the acoustic source position, 10° steps for an angle of the acoustic source position, etc. The implementability can for example also be assessed on the basis of map data, other sensor data, such as from a camera, a recorded traffic density or the like. By way of example, in a built-up area, it can be assumed that the maximum velocity of the acoustic source, even on well-developed downtown roads, is below 30 to 40 m/s, etc. The other stipulated values can also be realistically assessed. A weakly recorded acoustic signal may be further away than a strongly recorded acoustic signal, etc.

In accordance with one development, the ranges of values of the stipulations or assumptions of the velocity, the acoustic source position and/or the signal frequency can be limited in an iterative exclusion method. In other words, an iterative method can involve those combinations of the above stipulations being limited to the possible combinations by means of an exclusion method. For example a combination can be excluded if it is not able to describe the measured observations.

In one development, those combinations of the stipulations or assumptions for the velocity, the direction, the acoustic source position and/or the signal frequency that are inconsistent with the determined observer frequency can be iteratively excluded.

In accordance with one development, a determination, e.g. calculation, of the signal frequency can be performed in every n-th Doppler calculation and can be compared with the stipulation of the signal frequency. This means that the stipulations are initially started with a multiplicity of values and, together with the observer frequency, the signal frequency required therefor is calculated. If the signal frequency is outside a possible range of values for a combination of the stipulations, this combination can be excluded. For each iteration, a new signal frequency is calculated for each combination of stipulations. As soon as a signal frequency is outside a predetermined range of values or fluctuates by more than an acceptable value between at least two iterations, it is excluded, since it can be assumed that the signal frequency does not change in reality or changes only according to a known pattern, such as for example in the case of a siren or the like.

In one development, a difference in the signal frequency can be determined from the n Doppler calculations, and the locating is effected on the basis of those stipulations of the velocity and of the acoustic source position that have the smallest possible difference in the calculated signal frequency. It is possible e.g. for a root mean square, also referred to as RMS, of the differences to be determined over n iteration steps. The locating can then be effected on the basis of the stipulations that have the smallest root mean square, for example.

In accordance with one development, a change of situation between two successive Doppler calculations and/or determinations of the observer frequency ($f_E$) on the basis of velocity and acoustic source position can be taken into consideration.

In accordance with one development, at least the acoustic source or the vehicle can move during the acoustic recording and/or the locating. The resulting behavior in the change in the Doppler shift can be used for the locating. Alternatively, it is possible for the Doppler shift not to change, for example if the vehicle and the acoustic source move toward one another, with information about the direction also being obtained therefrom.

In one development, the acoustic signal can contain repetitive sequences. By way of example, it can contain chirps, a repeated constant tone and/or known frequency hops or hops between known fundamental frequencies. This can be used for the locating.

In accordance with one development, it is possible for only a single microphone of the acoustic recording device to be used for recording the acoustic signal and/or for the locating.

Further measures improving the disclosure are depicted in more detail below together with the description of the preferred exemplary embodiments of the disclosure with reference to figures. As such, the locating can be effected with little hardware complexity. The vehicle can alternatively have multiple microphones, the acoustic source then being able to be located by means of a single one of these microphones, and the remaining microphones being able to perform other tasks.

In accordance with a second aspect, the disclosure also relates to an apparatus for operating a vehicle. The apparatus has a data processing device and can be suitable in particular for operating a vehicle driving in at least partially automated fashion. The data processing device can be e.g. an electronic controller or a controller pool of the vehicle, wherein the data processing device can have for example at least one processor, a memory for program instructions and/or data, a data interface, etc. The data processing device is configured to determine an observer frequency ($f_E$), referenced to the vehicle (100), of the recorded acoustic signal (S), to stipulate a velocity ($v_S$) of the acoustic source (200), to stipulate an acoustic source position (x, y, d, α) relative to a position of the vehicle (100), to determine a signal frequency ($f_S$) and to locate the acoustic source (200) by means of a Doppler calculation, performed n times, using the observer frequency ($f_E$), the velocity ($v_S$), the signal frequency ($f_S$) and the acoustic source position (x, y, d, α).

This allows the advantages explained above for the method to be achieved, for example.

In accordance with a third aspect, a system for locating an acoustic source relative to a vehicle is also proposed. The system has an acoustic recording device, e.g. an individually used microphone or a plurality of microphones, and a data processing device. The data processing device can have a memory for program instructions, at least one processor and an interface to the acoustic recording device. The data processing device can also interact with one or more vehicle systems in order to allow appropriately automated driving control on the basis of the located acoustic source in particular in the case of a vehicle driving in at least partially automated fashion. The data processing device is configured to determine an observer frequency, referenced to the vehicle, of the recorded acoustic signal, to stipulate a velocity and direction of movement of the acoustic source, to stipulate an acoustic source position relative to a position of the vehicle, and to locate the acoustic source by means of a Doppler calculation, performed n times, using the observer frequency ($f_E$), the velocity, the signal frequency and the acoustic source position.

This system allows the acoustic source to be located by means of just a single microphone. In this case, the locating of the acoustic source can comprise the direction, the distance, the velocity (absolute value and direction) and the exact frequency of the acoustic signal of the acoustic source before the Doppler shift. The locating is effected with little computational complexity by virtue of an iterative analysis of the situation, in which unrealistic parameters of the locating of the acoustic source are excluded and realistic parameters are rated and conditioned. This allows the vehicle to be controlled in at least partially automated fashion such that e.g. to yield to vehicles having higher priority, such as for example service vehicles, in automated fashion.

In accordance with a fourth aspect, the disclosure relates to a program element or computer program for operating a vehicle, which, when executed by a processor of a data processing device, is configured to perform a method in accordance with the first aspect.

A fifth aspect of the disclosure relates to a computer-readable storage medium, having a computer program in accordance with the fourth aspect.

BRIEF DESCRIPTION OF THE DRAWINGS

Advantageous exemplary embodiments of the disclosure are described in detail below with reference to the accompanying figures, in which.

DETAILED DESCRIPTION

The figures are merely schematic and not to scale. Throughout the figures, elements that are the same, have the same effect or are similar are provided with the same reference signs.

Figure 1:
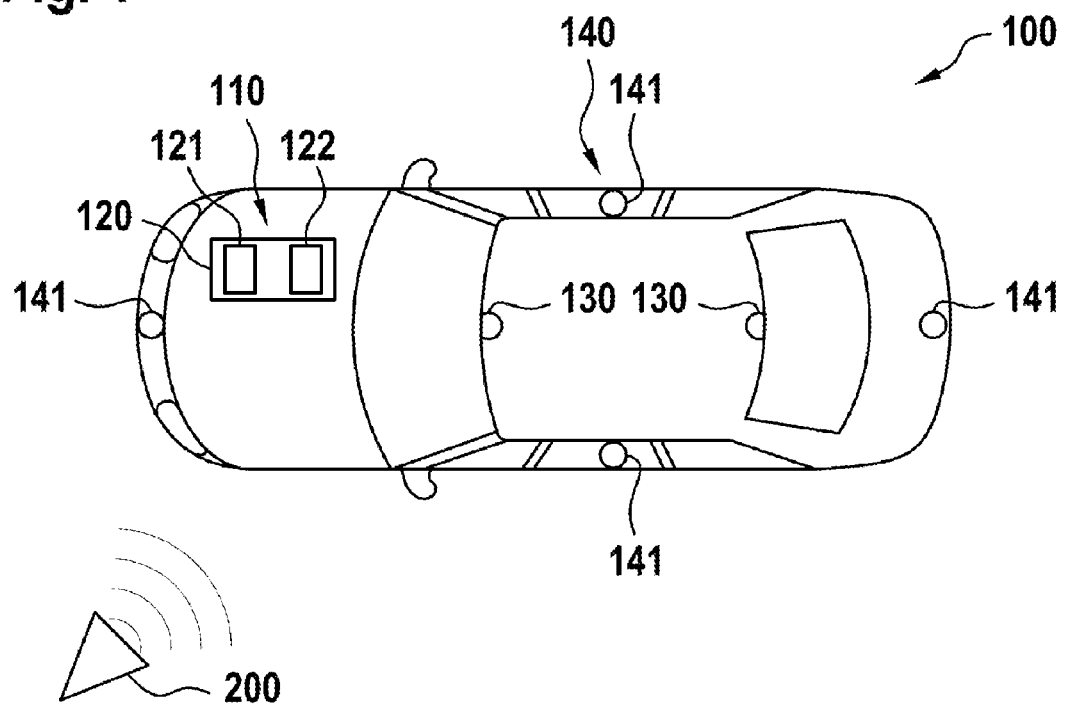
FIG. 1 shows a vehicle having a system that allows an acoustic source to be located relative to the vehicle.

FIG. 1 shows a vehicle 100, which, in the present case, in exemplary fashion, is a motor vehicle driving in at least partially automated fashion. Accordingly, the vehicle 100 has actuators (not denoted in more detail) and a vehicle drive, these being able to be electronically actuated for the purpose of automated driving control, for example for the purpose of accelerating, braking, steering, etc., the vehicle 100.

The vehicle 100 further has a vehicle system 110, for example in the form of a driving assistance system, which has a data processing apparatus 120, for example in the form of an electronic controller, for actuating the actuators and the vehicle drive, multiple further sensors 130 interacting therewith, such as for example optical sensors, ultrasonic sensors, LIDAR, etc., and an acoustic recording device 140, likewise interacting therewith, for recording sounds, tones or the like from an acoustic source 200 arranged in the vehicle environment, i.e. in exterior surroundings of the vehicle. The acoustic source 200 can be for example another road user, but in particular a service vehicle, such as for example a police vehicle, fire vehicle, emergency service vehicle or the like. The data processing device 120 has a processor 121 and a memory 122 for storing program instructions for operating the vehicle 100. In the present case, the further sensors 130 are, in exemplary fashion, cameras that e.g. optically record the area in front of and behind the vehicle 100 and supply these recording data to the data processing device 120, which can thus steer the vehicle 100 through the vehicle environment, that is to say for example the road traffic.

The acoustic recording device 140 has a plurality of microphones 141. In some exemplary embodiments, the microphones 141 may be oriented toward the outside, in particular in a direction pointing away from the vehicle 100. It should be noted that a single microphone 141 is already adequate in the description below, which means that this hardware costs can be saved.

In particular when using a single instance of the microphones 141 or when using one of the microphones 141, locating the acoustic source 200 relative to the vehicle 100 is a non-trivial problem. In particular in an automated driving mode of the vehicle 100, the locating or the most accurate determination of the location of the acoustic source 200 possible can be used as information for determining the driving strategy, a driving maneuver or the like of the vehicle 100. There follows an explanation that the acoustic recording device 140 can be used to locate the acoustic source 200 at least with sufficient accuracy.

Figure 2:
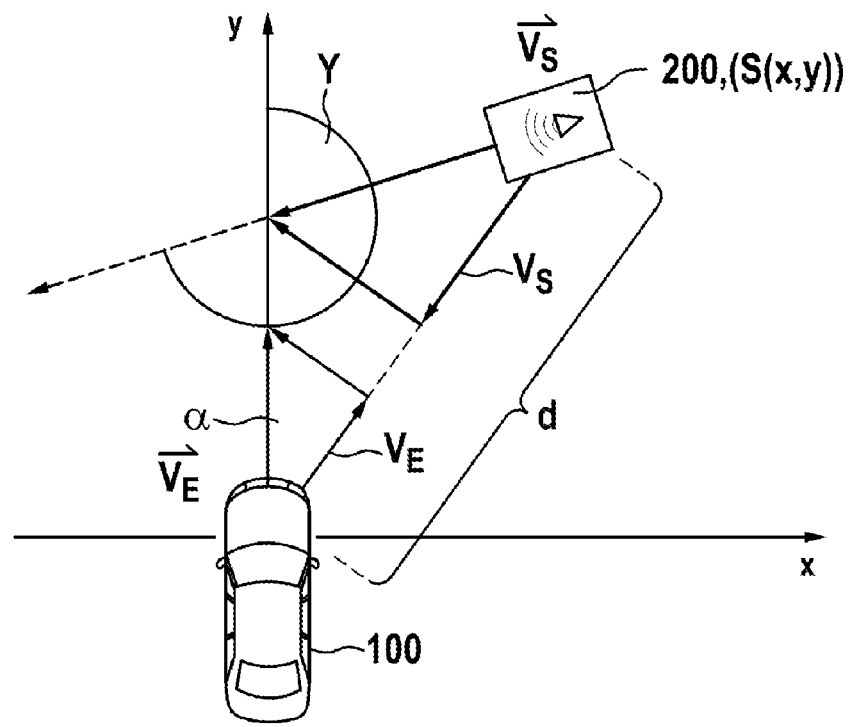
FIG. 2 shows a graph depicting determination and stipulation values or parameters that are used for locating an acoustic source relative to a vehicle.

For the purpose of better illustration, FIG. 2 shows a graph having a coordinate system that has an x axis, which specifies a length of displacement in meters (m), for example, and a y axis, which likewise specifies a length of displacement in meters (m). Merely in exemplary fashion, the vehicle 100, which can also be referred to as the ego-vehicle, is arranged at least approximately at the coordinate origin of the coordinate system. The acoustic source 200 is arranged in the first quadrant, that is to say is at a distance from the vehicle 100 both in the X direction and in the Y direction. A current location of the acoustic source 200 can be specified using an x coordinate and a y coordinate in the present case for the purpose of illustration, e.g. as S (x, y). There is a distance d between the vehicle 100 and the acoustic source 200.

It is assumed that either only the vehicle 100 moves, only the acoustic source 200 moves or both the vehicle 100 and the acoustic source 200 move. Depending on the assumption, the vehicle 100 moves with a velocity vector $|\overline{v_E}|$ along the y axis, as indicated in the graph. It should be noted that the proper motion of the vehicle 100 is defined as movement in the y direction, which means that the vector velocity vector $|\overline{v_E}|$ always points in the same direction. Moreover, the velocity $v_E$ of the vehicle 100 is the velocity component of $|\overline{v_E}|$ specified at an angle α (angle with respect to the y axis) in the direction of the acoustic source 200. Similarly, depending on the assumption, the acoustic source 200 moves with an absolute value of the velocity vector $|\overline{v_S}|$ at an angle γ (angle in respect of the y axis). An acoustic signal S transmitted by the acoustic source 200 has a velocity $v_S$ in the direction of the vehicle 100.

On the basis of FIG. 2, a Doppler calculation can be performed using equation (1)

$$f_s = f_E \frac{c + |\overline{v_s}|\cos(\gamma - \alpha)}{c + |\overline{v_E}|\cos\alpha} \quad (1)$$

where $f_S$ specifies a signal frequency of the acoustic signal S, $f_E$ specifies an observer frequency of the acoustic signal S and c specifies the speed of sound. For the purpose of determining the location of the acoustic source 200 on the basis of this equation (1), in particular determining the direction, distance, velocity, direction of movement and/or frequency of the acoustic source 200 or of the acoustic signal S transmitted thereby, the problem exists that the equation has five unknown variables $|\overline{v_S}|$, $\gamma$, $\alpha$, d and $f_S$, that is to say that the equation is underdetermined. In this case, d describes the distance between the vehicle and the acoustic source. This is necessary in order to be able to calculate changes in the other variables over time.

To solve this problem, the data processing device 120 is configured to limit some of the unknown variables to values or a range of values that is realistic in the driving mode of the vehicle 100, as explained in even more detail later on. Additionally, changes in the Doppler shift determinable by equation (1) are obtained on the basis of a relative movement between the vehicle 100 and the acoustic source 200. A combination of these two effects permits a sufficiently accurate assessment of the five variables, this assessment being able to be taken as a basis for the acoustic source 200 to be located with sufficient accuracy relative to the vehicle 100.

The data processing device 120 is in particular configured to use acoustic recording of the acoustic signal S to determine a value of the observer frequency $f_E$, referenced to the vehicle 100, of the recorded acoustic signal S. Moreover, the unknown variables are assessed, which means that initially a multiplicity of possible values, e.g. a range of values, of the velocity $v_S$ of the acoustic source 200 are stipulated. In addition, a multiplicity of values, e.g. a range of values, of an acoustic source position of the acoustic source 200 relative to the position of the vehicle 100 are stipulated, wherein the acoustic source position contains an assessment of the aforementioned variables x, y, d, $\alpha$, in particular. For the processing of these data in the data processing device 120, it is moreover assumed that the velocity and direction of the acoustic source does not change or hardly changes, that is to say is substantially constant, for at least a short period of time. Moreover, it can optionally be assumed that the signal frequency $f_S$ contains repetitive or other known sequences, as is the case in particular with emergency signals from a siren.

The acoustic source 200 is located by the data processing device 120 by virtue of equation (1) being solved for a number of times for a selection of preferably equally spaced, realistic values of $f_E$, $|\overline{v_S}|$, y, $\alpha$ and d, that is to say iteratively. Between the iterations or iteration steps, a new acoustic source position of the acoustic source 200 is determined on the assumption that at least $|\overline{v_S}|$, y, $\alpha$ and d are provided. If the assumption does not lead to a constant value, or to a value within a specific frequency range, of $f_S$ in a majority of iterations or in all iterations, it is eliminated, so that a smaller number of options remains. From the assumptions with the smallest differences in $f_S$, the data processing device 120 determines the location, the velocity and the direction of the acoustic source 200, and also the frequency of its acoustic signal S. The data processing device 120 can then provide this information for use in driving strategy planning, driving control or the like for the vehicle 100. As such, the vehicle 100 can also get out of the way of the acoustic source 200 in automated fashion, e.g. by virtue of the route, driving trajectory, etc., being replanned as appropriate.

Figure 3:
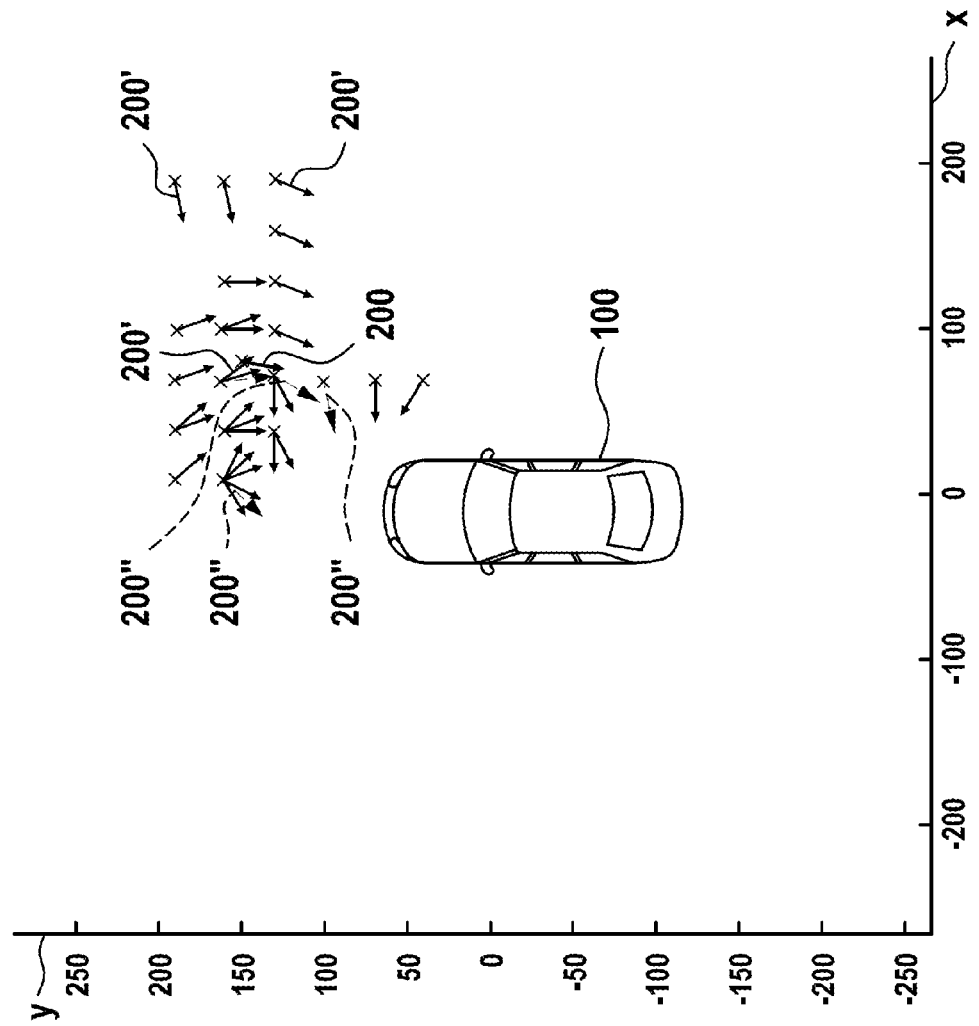
FIG. 3 shows a graph depicting different determinations of the location of the acoustic source.

FIG. 3 illustrates the locating of the acoustic source 200 by the data processing device 120 in a graph. Said graph again has an x axis in the form of a length of displacement in meters (m) and a y axis in the form of a length of displacement in meters (m) and shows the vehicle 100 at least approximately at the coordinate origin of the graph. The reference sign 200 denotes the actual position of the acoustic source, wherein the velocity vector $|\overline{v_S}|$ is represented by an arrow in the present case. The reference sign 200' denotes all possible calculated (estimated) positions of the acoustic source, which, in the present case merely in exemplary fashion, after a number of iterations, have a difference that are below a specific threshold value in the present case. It should be noted that the difference was ascertained by determining the root mean square (RMS), for example. Moreover, it should be noted that, for the sake of clarity, not all of the possible positions are denoted by a reference sign. All arrows not denoted by a reference sign, which in the present case again denote a velocity vector, therefore also correspond to possible positions of the acoustic source 200. The reference signs 200" indicate those acoustic source positions (determined by the data processing device 120) of the acoustic source that have the smallest difference in the number of iterations and can accordingly be regarded as the most likely position of the acoustic source. In this case too, the respective velocity vector is depicted by an arrow.

Figure 4:
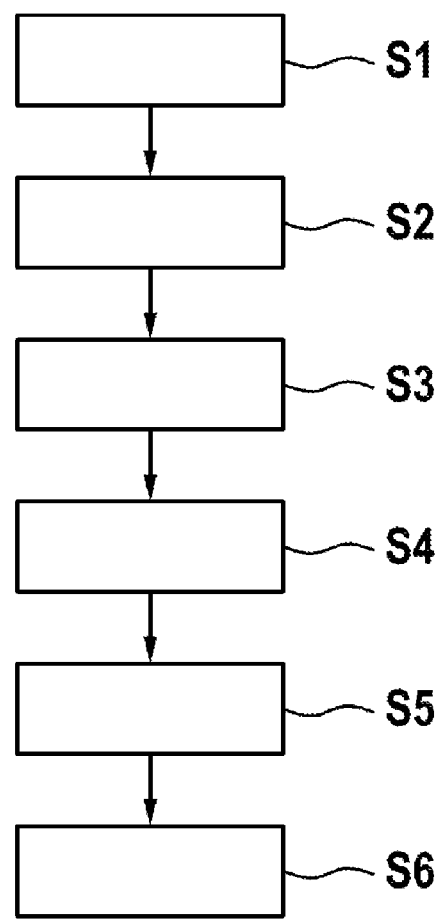
FIG. 4 shows a flowchart for a method for locating an acoustic source relative to a vehicle.

FIG. 4 uses a flowchart to summarize a method for locating the acoustic source 200 relative to the vehicle 100. The method is performed in particular using the data processing device 120 described above and the acoustic recording device 140.

A step S1 involves the acoustic signal S transmitted by the acoustic source 200 being obtained. A step S2 involves the observer frequency $f_E$, referenced to the vehicle 100, of the obtained acoustic signal S being determined, for example recorded or measured. A step S3 involves a velocity $v_S$ of the acoustic source 200 being stipulated. A step S4 involves the acoustic source position x, y, d, $\alpha$ relative to a position of the vehicle 100 being stipulated. A step S5 involves the signal frequency $f_S$ being determined. A step S6 involves the acoustic source 200 being located by means of a Doppler calculation, performed n times, using the observer frequency $f_E$, the velocity $v_S$, the signal frequency $f_S$ and the acoustic source position x, y, d, $\alpha$.

What is claimed is:

1. A method for locating an acoustic source relative to a vehicle, the method comprising:
   obtaining an acoustic signal transmitted by the acoustic source;
   determining a determined observer frequency, referenced to the vehicle, of the obtained acoustic signal;
   stipulating a plurality of stipulated velocities of the acoustic source;
   stipulating a plurality of stipulated relative positions of the acoustic source relative to a position of the vehicle;
   determining a first determined signal frequency; and
   locating the acoustic source by performing a plurality of Doppler calculations using the determined observer frequency, the first determined signal frequency, and a plurality of different combinations of velocity and relative position values from the plurality of stipulated velocities and the plurality of stipulated relative positions.

2. The method according to claim 1, wherein at least one of (i) the plurality of stipulated velocities, (ii) the plurality of stipulated relative positions, and (iii) the first determined signal frequency is within a respective associated range of values having a plurality of single values, each respective associated range of values being at least approximately implemented in a current driving situation on which the locating is based.

3. The method according to claim 2 further comprising:
limiting, in an iterative exclusion process, the respective associated range of values for at least one of (i) the plurality of stipulated velocities, (ii) the plurality of stipulated relative positions, and (iii) the first determined signal frequency.

4. The method according to claim 1 further comprising:
iteratively excluding combinations of at least one of (i) the plurality of stipulated velocities, (ii) the plurality of stipulated relative positions, and (iii) the first determined signal frequency that are inconsistent with the determined observer frequency.

5. The method according to claim 1 further comprising:
determining a second determined signal frequency in every n-th Doppler calculation of the plurality of Doppler calculations; and
comparing the second determined signal frequency and the first determined signal frequency.

6. The method according to claim 5 further comprising:
determining a difference between the second determined signal frequency and the first determined signal frequency from the plurality of Doppler calculations,
wherein the locating is performed based on the combination of velocity and relative position values from the plurality of stipulated velocities and the plurality of stipulated relative positions that result in a smallest difference between the second determined signal frequency and the first determined signal frequency.

7. The method according to claim 1, wherein at least one of (i) two successive determinations of the determined observer frequency and (ii) two successive Doppler calculations of the plurality of Doppler clalculations take into account a change of velocity and relative position of the acoustic source.

8. The method according to claim 1, wherein at least one of the acoustic source and the vehicle moves during at least one of the obtaining of the acoustic signal and the locating of the acoustic source.

9. The method according to claim 1, wherein only a single microphone of the vehicle is used for the locating.

10. An apparatus for locating an acoustic source relative to a vehicle, the apparatus comprising:
a data processing device configured to:
  determine a determined observer frequency, referenced to the vehicle, of a recorded acoustic signal transmitted by the acoustic source;
  stipulate a plurality of stipulated velocities of the acoustic source;
  stipulate a plurality of stipulated relative positions of the acoustic source relative to a position of the vehicle;
  determine a first determined signal frequency; and
  locate the acoustic source by performing a plurality of Doppler calculations using the determined observer frequency, the first determined signal frequency, and a plurality of different combinations of velocity and relative position values from the plurality of stipulated velocities and the plurality of stipulated relative positions.

11. A system for locating an acoustic source relative to a vehicle, the system comprising:
an acoustic recording device configured to record an acoustic signal transmitted by the acoustic source; and
a data processing device configured to:
  determine a determined observer frequency, referenced to the vehicle, of the recorded acoustic signal;
  stipulate a plurality of stipulated velocities of the acoustic source;
  stipulate a plurality of stipulated relative positions of the acoustic source relative to a position of the vehicle;
  determine a first determined signal frequency; and
  locate the acoustic source by performing a plurality of Doppler calculations using the determined observer frequency, the first determined signal frequency, and a plurality of different combinations of velocity and relative position values from the plurality of stipulated velocities and the plurality of stipulated relative positions.

12. The system according to claim 11, wherein a processor of the data processing device executes a computer program.

13. The system according to claim 12, wherein the computer program is stored on a computer-readable storage medium.

* * * * *